United States Patent
Xiao et al.

(10) Patent No.: US 11,068,048 B2
(45) Date of Patent: Jul. 20, 2021

(54) METHOD AND DEVICE FOR PROVIDING AN IMAGE

(71) Applicant: SAMSUNG ELECTRONICS CO., LTD., Suwon-si (KR)

(72) Inventors: Peng Xiao, Nanjing (CN); Haoliang Zhu, Nanjing (CN); Zengwan Chen, Nanjing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/822,340

(22) Filed: Nov. 27, 2017

(65) Prior Publication Data

US 2018/0150132 A1 May 31, 2018

(30) Foreign Application Priority Data

Nov. 25, 2016 (CN) .......................... 201611049218.1
Nov. 23, 2017 (KR) .......................... 10-2017-0157514

(51) Int. Cl.
*G06F 3/01* (2006.01)
*G06F 3/0484* (2013.01)
*G06T 3/40* (2006.01)

(52) U.S. Cl.
CPC .............. *G06F 3/012* (2013.01); *G06F 3/013* (2013.01); *G06F 3/0484* (2013.01); *G06F 3/04842* (2013.01); *G06T 3/40* (2013.01); *G06F 2203/04806* (2013.01)

(58) Field of Classification Search
None
See application file for complete search history.

(56) References Cited

U.S. PATENT DOCUMENTS 9,213,403 B1  12/2015  Raffle et al.
9,360,671 B1   6/2016  Zhou
2013/0050432 A1  2/2013  Perez et al.
(Continued)

FOREIGN PATENT DOCUMENTS

CN   103118202 A   5/2013
CN   104796594 A   7/2015
(Continued)

OTHER PUBLICATIONS

Search Report dated Feb. 9, 2018, issued by the International Searching Authority in counterpart International Patent Application No. PCT/KR2017/013483 (PCT/ISA/210).
(Continued)

*Primary Examiner* — Brian M Butcher
(74) *Attorney, Agent, or Firm* — Sughrue Mion, PLLC

(57) ABSTRACT

A device and a method for zooming in/out on an image on a virtual reality (VR) device are provided. The method may include: identifying that a posture of a user of the VR device is at least one of a zooming in posture and a zooming out posture, based on a displacement vector of a head of the user; zooming in the image in response to a zooming in condition being satisfied, wherein the zooming in condition comprises the posture of the user being the zooming in posture; and zooming out the image, in response to a zooming out condition being satisfied, wherein the zooming out condition comprises the posture of the user being the zooming out posture.

17 Claims, 6 Drawing Sheets

(56) References Cited

U.S. PATENT DOCUMENTS

| | | | |
|---|---|---|---|
| 2013/0169560 A1* | 7/2013 | Cederlund | B60K 37/06 345/173 |
| 2014/0129938 A1 | 5/2014 | Tang | |
| 2014/0198129 A1* | 7/2014 | Liu | G06F 3/04815 345/633 |
| 2015/0346813 A1 | 12/2015 | Vargas et al. | |
| 2016/0147296 A1 | 5/2016 | Yun et al. | |
| 2016/0154493 A1 | 6/2016 | Song | |
| 2016/0187969 A1 | 6/2016 | Larsen et al. | |
| 2016/0283189 A1 | 9/2016 | Wang | |
| 2016/0337593 A1 | 11/2016 | Guo | |

FOREIGN PATENT DOCUMENTS

| | | |
|---|---|---|
| CN | 104822088 A | 8/2015 |
| CN | 105334962 A | 2/2016 |
| CN | 105359084 A | 2/2016 |
| CN | 105898346 A | 8/2016 |
| CN | 106131483 A | 11/2016 |
| KR | 10-2015-0001425 A | 1/2015 |
| WO | 2015062320 A1 | 5/2015 |

OTHER PUBLICATIONS

Written Opinion dated Feb. 9, 2018, issued by the International Searching Authority in counterpart International Patent Application No. PCT/KR2017/013483 (PCT/ISA/237).

Communication dated Dec. 14, 2018, from the State Intellectual Property Office of People's Republic of China in counterpart Application No. 201611049218.1.

Communication dated May 17, 2019, from the State Intellectual Property Office of People's Republic of China in counterpart Application No. 201611049218.1.

Communication dated Nov. 8, 2019, issued by the European Patent Office in counterpart European Application No. 17873373.9.

* cited by examiner

METHOD AND DEVICE FOR PROVIDING AN IMAGE

CROSS-REFERENCE TO RELATED APPLICATIONS

This application claims priority from Korean Patent Application No. 10-2017-0157514, filed on Nov. 23, 2017, in the Korean Intellectual Property Office, and Chinese Patent Application Serial No. 201611049218.1, filed on Nov. 25, 2016 in the State Intellectual Property Office (SIPO) of the People's Republic of China, the entire disclosures of which are incorporated herein by reference.

FIELD OF THE TECHNOLOGY

The present disclosure relates to virtual reality (VR) technology, and in particular, to a method and a device for zooming in or out on an image on a VR device.

BACKGROUND

Usually, zooming in or out on an image displayed on a two-dimensional display device may be controlled by pressing buttons of the device or touching the screen of the device. With the development of the VR technology, there is a need to provide a scheme implementing zooming in or out on an image displayed on a VR device.

SUMMARY

One or more example embodiments provide a method and a device for zooming in or out on an image on a VR device.

According to an aspect of an example embodiment, there is provided a method for zooming in or out on an image on a VR device. The method may include: identifying that a posture of a user of the VR device is at least one of a zooming in posture and a zooming out posture, based on a displacement vector of a head of the user; zooming in the image, in response to a zooming in condition being satisfied, wherein the zooming in condition comprises the posture of the user being the zooming in posture; and zooming out the image, in response to a zooming out condition being satisfied, wherein the zooming out condition comprises the posture of the user being the zooming out posture.

The identifying may include identifying that the posture of the user is the zooming in posture, in response to a first component of the displacement vector in a first positive direction of a first axis of a three-dimensional rectangular coordinate system being greater than a first threshold and a second component of the displacement vector in a second axis and a third component of the displacement vector in a third axis of the three-dimensional rectangular coordinate system being less than a second threshold; and identifying that the posture of the user is the zooming out posture, in response to at least one of: the first component of the displacement vector in a negative direction of the first axis being greater than the first threshold and the second and third components of the displacement vector in the second axis and the third axis being less than the second threshold, and the second component of the displacement vector in a second positive direction of the second axis being greater than the first threshold and the first and third components of the displacement vector in the first axis and the third axis being less than the second threshold.

The method may further include: determining whether angular velocities of the head of the user in each directions for roll, pitch, and yaw, which are rotations about the first axis, the second axis, and the third axis, respectively, are smaller less than an angular velocity threshold. At least one of the zooming in the image and the zooming out the image may be performed in response to the angular velocities being less than the angular velocity threshold.

The method may further include: identifying a focus of eyes of the user on the image. The zooming in the image and the zooming out the image may be performed by using the focus as a zoom center.

The method may further include: identifying a focus of eyes of the user on the image; and identifying a part of the image, the part being observed by the user according to the focus. The zooming in the image may include zooming in the part of the image. The zooming out the image may include zooming out the part of the image.

The zooming in condition may further include at least one of: a zoom level of the image is lower than a first zoom level threshold, and a focus of eyes of the user is located on the image. The zooming out condition further comprises at least one of: the zoom level of the image is higher than a second zoom level threshold, and the focus of the eyes of the user is located on the image.

Each of the zooming in condition and the zooming out condition may further include: an absolute value of a difference between a first acceleration vector in a moving direction of a vehicle estimated by the vehicle on which the user is boarding and a second acceleration vector in the moving direction of the vehicle estimated by the VR device is greater than a threshold.

The zooming in the image may include: estimating a first velocity of the head of the user in a positive direction of a first axis of a three-dimensional rectangular coordinate system; continuing the zooming in the image in response to the first velocity being greater than or equal to 0; and stopping the zooming in the image in response to the first velocity being less than 0. The zooming out the image may include: estimating a second velocity of the head of the user in one of a negative direction of the first axis and a positive direction of a second axis of the three-dimensional rectangular coordinate system; continuing the zooming out the image in response to the second velocity being greater than or equal to 0; and stopping the zooming out the image in response to the second velocity being less than 0.

The zooming in posture may be tilting the head to left of the user, and the zooming out posture may be tilting the head to right of the user. Alternatively, the zooming in posture may be tilting the head to the right of the user, and the zooming out posture may be tilting the head to the left of the user. Alternatively, the zooming in posture may be tilting the head forward of the user, and the zooming out posture may be tilting the head backward of the user. Alternatively, the zooming in posture may be tilting the head backward of the user, and the zooming out posture may be tilting the head forward of the user.

According to an aspect of an example embodiment, a virtual reality (VR) device for providing an image may include: a sensor configured to estimate a movement of a head of a user of the VR device; and a controller configured to: identify that a posture of the user is at least one of a zooming in posture and a zooming out posture, based on a displacement vector of the movement, zoom in the image, in response to a zooming in condition being satisfied, wherein the zooming in condition includes the posture of the user being zooming in posture, and zoom out the image, in response to a zooming out condition being satisfied, wherein the zooming out condition includes the posture of the user being the zooming out posture.

The controller may be further configured to: identify that the posture of the user is the zooming in posture, in response to a first component of the displacement vector in a first positive direction of a first axis of a three-dimensional rectangular coordinate system being greater than a first threshold and a second component of the displacement vector in a second axis and a third component of the displacement vector in a third axis of the three-dimensional rectangular coordinate system being less than a second threshold; and identify that the posture of the user is the zooming out posture, in response to at least one of the first component of the displacement vector in a negative direction of the first axis being greater than the first threshold and the second and third components of the displacement vector in the second axis and the third axis being less than the second threshold, the second component of the displacement vector in a second positive direction of the second axis being greater than the first threshold and the first and third components of the displacement vector in the first axis and the third axis being less than the second threshold.

The controller may be further configured to: determine whether angular velocities of the head of the user in each directions for roll, pitch, and yaw, which are rotations about the first axis, the second axis, and the third axis, respectively, are less than an angular velocity threshold; zoom in the image in response to the angular velocities being less than the angular velocity threshold; and zoom out the image in response to the angular velocities being less than the angular velocity threshold.

The controller may be further configured to: identify a focus of eyes of the user on the image; zoom in the image by using the focus as a zoom center; and zoom out the image by using the focus as the zoom center.

The controller may be further configured to: identify a focus of eyes of the user on the image; identify a part of the image, the part being observed by the user according to the focus; zoom in the part of the image; and zoom out the part of the image.

The zooming in condition may further include at least one of: a zoom level of the image is lower than a first zoom level threshold, and a focus of eyes of the user is located on the image. The zooming out condition may further include at least one of: the zoom level of the image is higher than a second zoom level threshold, and the focus of the eyes of the user is located on the image.

Each of the zooming in condition and the zooming out condition may further include: an absolute value of a difference between a first acceleration vector in a moving direction of a vehicle estimated by the vehicle on which the user is boarding and a second acceleration vector in the moving direction of the vehicle estimated by the VR device is greater than a threshold.

The controller may be further configured to: estimate a first velocity of the head of the user in a positive direction of a first axis of a three-dimensional rectangular coordinate system; continue the zooming in the image in response to the first velocity being greater than or equal to 0; stop the zooming in the image in response to the first velocity being less than 0; estimate a second velocity of the head of the user in one of a negative direction of the first axis and a positive direction of a second axis of the three-dimensional rectangular coordinate system; continue the zooming out the image in response to the second velocity being greater than or equal to 0; and stop the zooming out the image in response to the second velocity being less than 0.

The zooming in posture may be tilting the head to left of the user, and the zooming out posture may be tilting the head to right of the user. Alternatively, the zooming in posture may be tilting the head to right of the user, and the zooming out posture may be tilting the head to left of the user. Alternatively, the zooming in posture may be tilting the head forward of the user, and the zooming out posture may be tilting the head backward of the user. Alternatively, the zooming in posture may be tilting the head backward of the user, and the zooming out posture may be tilting the head forward of the user.

BRIEF DESCRIPTION OF THE DRAWINGS

The above and/or other aspects will become apparent and more readily appreciated from the following description of example embodiments, taken in conjunction with the accompanying drawings in which.

DETAILED DESCRIPTION OF EXAMPLE EMBODIMENTS

Hereinafter, the operating principles of example embodiments of the present disclosure will be described with reference to the accompanying drawings. In the following description, a detailed description of related well-known functions or configurations will not be provided if it unnecessarily obscures the subject matter of the present disclosure. Further, the terminologies to be described below are defined in consideration of functions in the present disclosure and may vary depending on a user's or operator's intention or practice. Therefore, the definitions should be made based on the contents throughout the entire description of the present disclosure.

Figure 1:
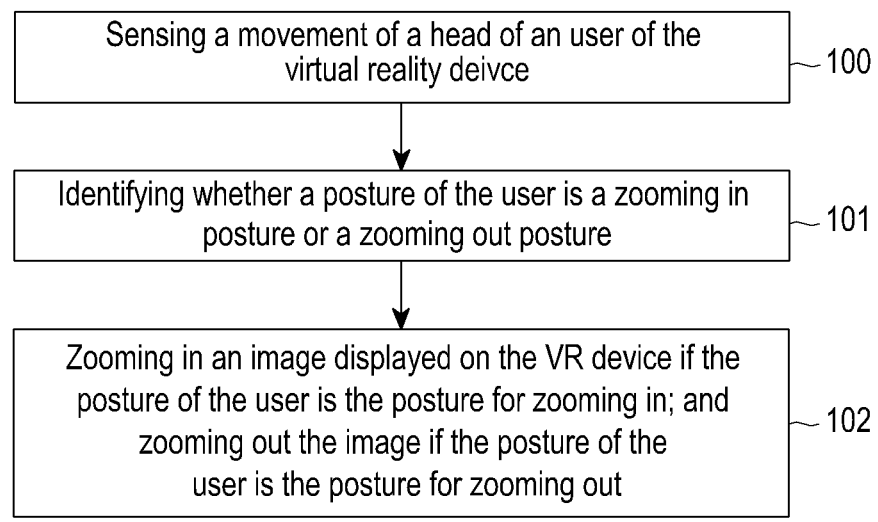
FIG. 1 is a flowchart illustrating a method of operating a VR device according to an example embodiment.
Figure 6:
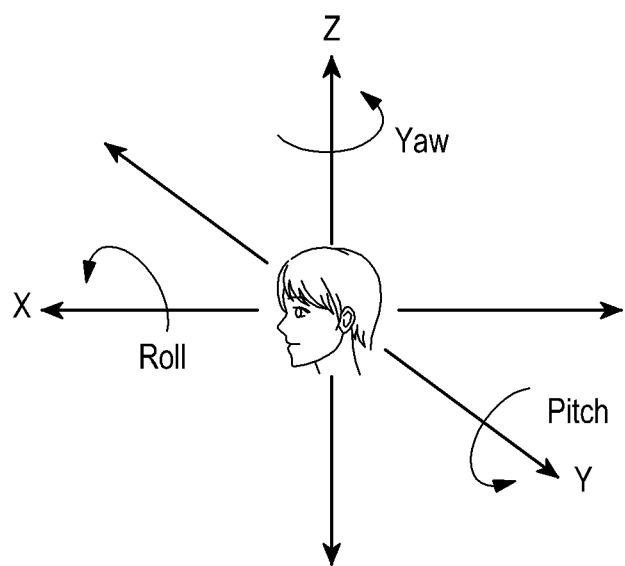
FIG. 6 is a diagram illustrating a coordinate system in which a user's rotational motion is defined in a virtual reality device according to an example embodiment.

FIG. 1 is a flowchart illustrating a method of operating a VR device according to an example embodiment. FIG. 6 is a diagram illustrating a coordinate system in which a user's rotational motion is defined in a virtual reality device according to an example embodiment.

In operation 100, The VR device may sense a movement of a head of a user of the virtual reality device.

Then, in operation 101, the VR device may identify whether the posture of the head of the user is a zooming in posture or a zooming out posture. In other words, the VR device may determine whether the posture of the head corresponds to a zoom-in command or a zoom-out command. Here, the posture of the head of the user may mean a specific action, movement, orientation and/or velocity of the user's head. The posture of the user's head may be expressed as a displacement vector of the user's head. The displacement vector of the user's head may be a vector that is defined by a movement of the user's head from a first position to a second position.

Here, with respect to the image displayed on the virtual reality device or the virtual reality device, the zooming in posture (i.e., a posture that corresponds to a zoom-in command) and zooming out posture (i.e., a posture that corresponds to a zoom-out command) may be as follows.

For example, the posture for zooming in may be tilting the head to the left; and the posture for zooming out may be tilting the head to the right.

Alternatively, the posture for zooming in may be tilting the head to the right; and the posture for zooming out may be tilting the head to the left.

According to another example, the posture for zooming in may be tilting the head forward; and the posture for zooming out may be tilting the head backward.

Alternatively, the posture for zooming in may be tilting the head backward; and the posture for zooming out may be tilting the head forward.

The zooming in posture and the zooming out posture may be stored in the memory unit of the virtual reality device or may be set by a user of the virtual reality device using a setup program stored in the memory unit of the virtual reality device.

Whether the posture of the user's head of the virtual reality device is a zooming in posture or a zooming out posture may be identified through a process that includes the following steps. First, the direction indicated by a displacement vector of the posture for zooming in may be defined as the positive direction of the X-axis, the direction being perpendicular to the X-axis and pointing to the head of the user may be defined as the positive direction of the Y-axis, and the direction being perpendicular to the X-axis and Y-axis may be defined as the positive direction of the Z-axis, thereby a first coordinate system is established.

Then, components of a displacement vector of the head of the user in the directions of the X-axis, the Y-axis and the Z-axis may be estimated from an acceleration sensor of the VR device.

If the absolute value of the component of the displacement vector of the head of the user in the positive direction of the X-axis is greater than a first threshold, and the absolute values of the components of the displacement vector of the head of the user in the directions of the Y-axis and the Z-axis are both less than a second threshold, the posture of the head of the user may be identified as the posture for zooming in. The first threshold value and the second threshold value may be stored in the memory unit of the virtual reality device, or may be set by a user of the virtual reality device using a setup program stored in the memory unit of the virtual reality device.

And if the absolute value of the component of the displacement vector of the head of the user in the negative direction of the X-axis is greater than the first threshold, and the absolute values of the components of the displacement vector of the head of the user in the directions of the Y-axis and the Z-axis are both less than the second threshold, the posture of the head of the user may be identified as the posture for zooming out.

Alternatively, if the absolute value of the component of the displacement vector of the head of the user in the positive direction of the X-axis is greater than a first threshold, the absolute values of the components of the displacement vector of the head of the user in the directions of the Y-axis and the Z-axis are both less than a second threshold and the angular velocity of the head of the user in each directions for roll, pitch, and yaw, which are rotations about the X-axis, the Y-axis, and the Z-axis, respectively, are all less than an angular velocity threshold, the posture of the head of the user may be identified as the posture for zooming in.

Referring to FIG. 6, the yaw may indicate a rotation angle about the Z-axis. The yaw may be defined as a counterclockwise rotation when looking the center of the coordinate axis on the Z-axis. The pitch may indicate a rotation angle about the Y-axis. The pitch may be defined as a counterclockwise rotation when looking the center of the coordinate axis on the Y-axis. The roll may indicate a rotation angle about the X-axis. The roll may be defined as a counterclockwise rotation when looking the center of the coordinate axis on the X-axis.

And if the absolute value of the component of the displacement vector of the head of the user in the negative direction of the X-axis is greater than the first threshold, the absolute values of the components of the displacement vector of the head of the user in the directions of the Y-axis and the Z-axis are both less than the second threshold and the angular velocity of the head of the user in each directions for roll, pitch, and yaw, which are rotations about the X-axis, the Y-axis, and the Z-axis, respectively, are all less than the angular velocity threshold, the posture of the head of the user may be identified as the posture for zooming out.

For example, when the posture for zooming in is tilting the head forward and the posture for zooming out is tilting the head backward, the process of detecting the posture of the head of the user of the VR device may include the following steps.

At first, the direction of the initial sight (e.g., forward eye gaze) of the user of the VR device obtained is defined as the positive direction of the X-axis, the direction which is perpendicular to the X-axis and points to the top of the head of the user is defined as the positive direction of the Y-axis. And the direction which is perpendicular to the X-axis and the Y-axis and points to the left of the user's head is defined as the positive direction of the Z-axis. Thereby, a first three-dimensional rectangular coordinate system is established. Wherein, the initial sight of the user of the VR device may be the direction from the center of the user's eyes to the focus of the user's eyes on the VR image displayed on the VR device.

Then components of a displacement vector of the head of the user in the directions of the X-axis, the Y-axis and the Z-axis of the first three-dimensional rectangular coordinate system may be obtained from an acceleration sensor of the VR device.

If the absolute value of the component of the displacement vector of the head of the user in the positive direction of the X-axis is greater than a first threshold, and the absolute values of the components of the displacement vector of the head of the user in the directions of the Y-axis and the Z-axis are both less than a second threshold, the user may be identified as having a posture of tilting the head forward.

And if the absolute value of the component of the displacement vector of the head of the user in the negative direction of the X-axis is greater than the first threshold, and the absolute values of the components of the displacement vector of the head of the user in the directions of the Y-axis and the Z-axis are both less than the second threshold, the user may be identified as having a pose of tilting the head backward.

Alternatively, if the absolute value of the component of the displacement vector of the head of the user in the positive direction of the X-axis is greater than a first threshold, the absolute values of the components of the displacement vector of the head of the user in the directions of the Y-axis and the Z-axis are both less than a second threshold, and the angular velocity of the head of the user in each directions for roll, pitch, and yaw, which are rotations about the X-axis, the Y-axis, and the Z-axis, respectively, are all less than a predetermined threshold, the user may be identified as having a posture of tilting the head forward.

And if the absolute value of the component of the displacement vector of the head of the user in the negative direction of the X-axis is greater than a first threshold, the absolute values of the components of the displacement vector of the head of the user in the directions of the Y-axis and the Z-axis are both less than a second threshold, and angular velocity of the head of the user in each directions for roll, pitch, and yaw, which are rotations about the X-axis, the Y-axis, and the Z-axis, respectively, are all less than an angular velocity threshold, the user may be identified as having a posture of tiling the head forward. In operation 102, if the posture of the head of the user of the VR device is the posture for zooming in, the image displayed on the VR device may be zoomed in on; and if the posture of the head of the user of the VR device is the posture for zooming out, the image displayed on the VR device may be zoomed out on.

In an example embodiment of the present application, before the image on the VR device is zoomed in on, the focus of the user's eyes (e.g., eye gaze) on the image may be detected. And the image on the VR device may be zoomed in on by taking the focus of user's eyes on the image as the center of zooming.

And in another example embodiment of the present application, before the image on the VR device is zoomed out on, the focus of the user's eyes on the image may be detected.

And the image on the VR device may be zoomed out on by taking the focus of the user's eyes on the image as the center of zooming.

In another example embodiment of the present application, before the image on the VR device is zoomed in on, the method may further include: determining whether the zoom level (e.g., magnification power, resolution, etc.) of the current image is lower than a first zoom level threshold, and/or determining whether the focus of the user's eyes is located on the image, and if the focus of the user's eyes is located on the image, then zooming in on the image on the VR device; or otherwise, performing no zooming in operation on the image on the VR device.

In another example embodiment of the present application, before the image on the VR device is zoomed out on, the method may further include: Determining whether the zoom level of the current image is higher than a second zoom level threshold, and/or determining whether the focus of the user's eyes is located on the image, and if the focus of the user's eyes is located on the image, then zooming out on the image on the VR device; or otherwise, performing no zooming out operation on the image on the VR device.

Further, considering the circumstance that the user wears the VR device on a moving vehicle, such as a car, accelerations may occur when the vehicle starts, stops or turns, and these accelerations may lead the user to tilt his head forward or backward. In order to avoid making any wrong decisions to zoom in or zoom out on the image in these kinds of situations, the method may further include the following solutions.

First of all, a first acceleration sensor may be included in the vehicle, and a second acceleration sensor may be included in the VR device. If the posture for zooming in is tilting the head forward, and the posture for zooming out is tilting the head backward; or, the posture for zooming in is tilting the head backward, and the posture for zooming out is tilting the head forward, a second three-dimensional rectangular coordinate system may be established by defining the moving direction of the vehicle as the positive direction of the X-axis, and defining the X-axis, the Y-axis and the Z-axis being perpendicular to one another. In other words, the measurements obtained by the second acceleration sensor of the VR device may be compensated or offset by the measurements obtained by the first acceleration sensor of the vehicle.

In operation 102, if the posture of the head of the user of the VR device is the zooming in posture, the method may further include the following procedure before zooming in on the image on the VR device.

The difference between the component of a first acceleration vector calculated by the first acceleration sensor and the component of a second acceleration vector calculated by the second acceleration sensor on the VR device in the positive direction of the X-axis of the second three-dimensional rectangular coordinate system may be estimated. And if the absolute value of the difference is greater than a predetermined value, the image on the VR device may be zoomed in on, or otherwise, no zooming in operation on the image on the device may be performed.

And in operation 102, if the posture of the head of the user of the VR device is the zooming out posture, the method may further include the following procedure before zooming out on the image on the VR device.

The difference between the component of the first acceleration vector calculated by the first acceleration sensor on the vehicle and the component of the second acceleration vector calculated by the second acceleration sensor on the VR device in the positive direction of the X-axis of the second three-dimensional rectangular coordinate system may be estimated. And if the absolute value of the difference is greater than a value, the image on the VR device may be zoomed out, or otherwise, no zooming out operation on the image on the device may be performed.

The executing entities of the above operations 100-102 may be the VR device, and the VR device may communicates with the first acceleration sensor included on the vehicle or a transceiver of the vehicle communicating values of the first acceleration sensor in real time and the communication may follow a same protocol specification, such as Internetworking Technology (ITO) protocols.

A method of operating a virtual reality device according to an example embodiment of the present disclosure is described with reference to FIGS. 1 and 2. FIG.

Figure 2A:
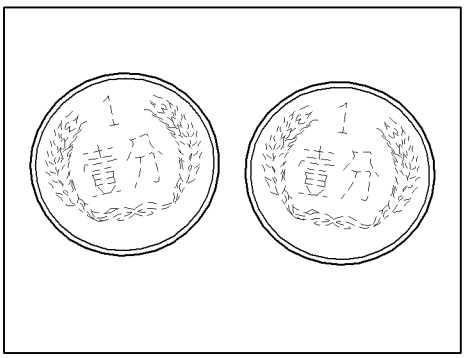
FIG. 2A is a diagram illustrating an example of an image displayed on a virtual reality device according to an example embodiment.
Figure 2B:
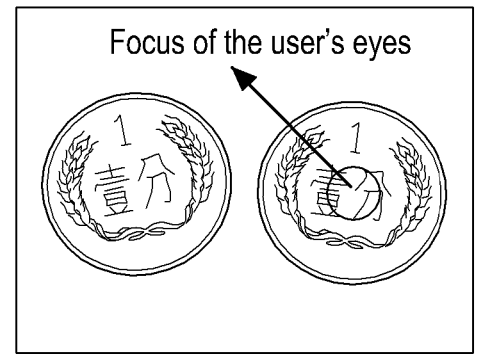
FIG. 2B is a view showing the focus of two eyes of the user on the image of FIG. 2A.
Figure 2C:
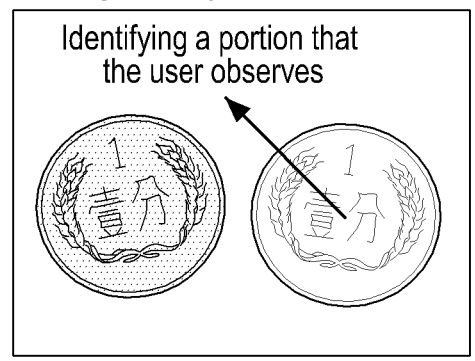
FIG. 2C is a diagram illustrating an operation for identifying a portion that the user observes on the image of FIG. 2B.
Figure 2D:
FIG. 2D is an illustration of the operation of zooming down the identified portion on the image of FIG. 2C.

FIG. 2A is a diagram illustrating an example of an image displayed on a virtual reality device according to an example embodiment of the present disclosure. FIG. 2B is a view showing the focus of two eyes of the user on the image of FIG. 2A. FIG. 2C is a diagram illustrating an operation for identifying a portion that the user observes on the image of FIG. 2B. FIG. 2D is an illustration of the operation of zooming down the identified portion on the image of FIG. 2C.

In order to reduce the power dissipation of the processor of the VR device, in operation 102, the method may further include the following procedure before zooming in on the image on the VR device, if the posture of the head of the user of the VR device is the posture for zooming in.

As shown in FIG. 2B, the VR device may detect the focus of two eyes of the user on the image displayed on the virtual reality device including the two coins as shown in FIG. 2A. Also, as shown in FIG. 2C, the VR device may identify the portion of the image that the user is observing according to the focus of the user's eyes. At this time, the boundaries of the object on the image where the focus of the user's two eyes are located can be detected by the boundary detection techniques. That is, the boundary of the right coin can be detected as shown in FIG. 2C. Also, as shown in FIG. 2D, an operation of zooming in may be performed only on the portion identified in the image. That is, only the right coin may be zoomed in as shown in FIG. 2D. And in operation 102, the method may further include the following procedure before zooming out on the image on the VR device, if the posture of the head of the user of the VR device is the posture for zooming out.

The focus of the user's two eyes may be detected as shown in FIG. 2B on the image displayed on the virtual reality device including the two coins as shown in FIG. 2A. Also, as shown in FIG. 2C, it is possible to identify the portion of the image that the user is observing according to the focus of the user's eyes. At this time, the boundaries of the object on the image where the focus of the user's two eyes are located may be detected by the boundary detection techniques. That is, the boundary of the right coin can be detected as shown in FIG. 2C. Also, an operation of zooming out may be performed only on the portion identified in the image. That is, only the right coin may be zoomed out in FIG. 2C.

Hereinafter, an operation method of the virtual reality device according to an example embodiment of the present disclosure is be described with reference to FIGS. 3A, 3B, and FIG. 4.

Figure 3A:
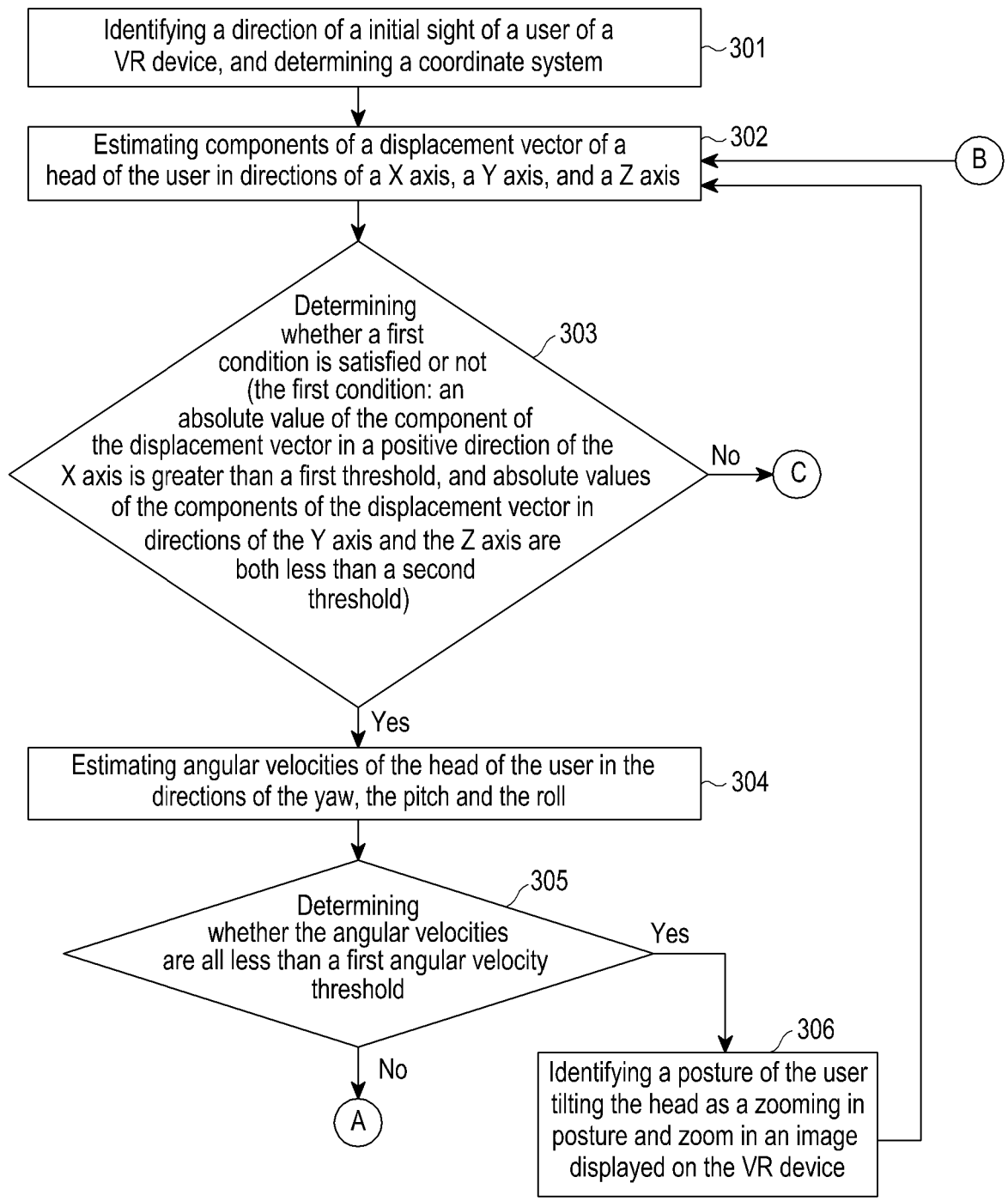
FIG. 3A and FIG. 3B are flowcharts of a method of operating a virtual reality device according to an example embodiment.
Figure 3B:
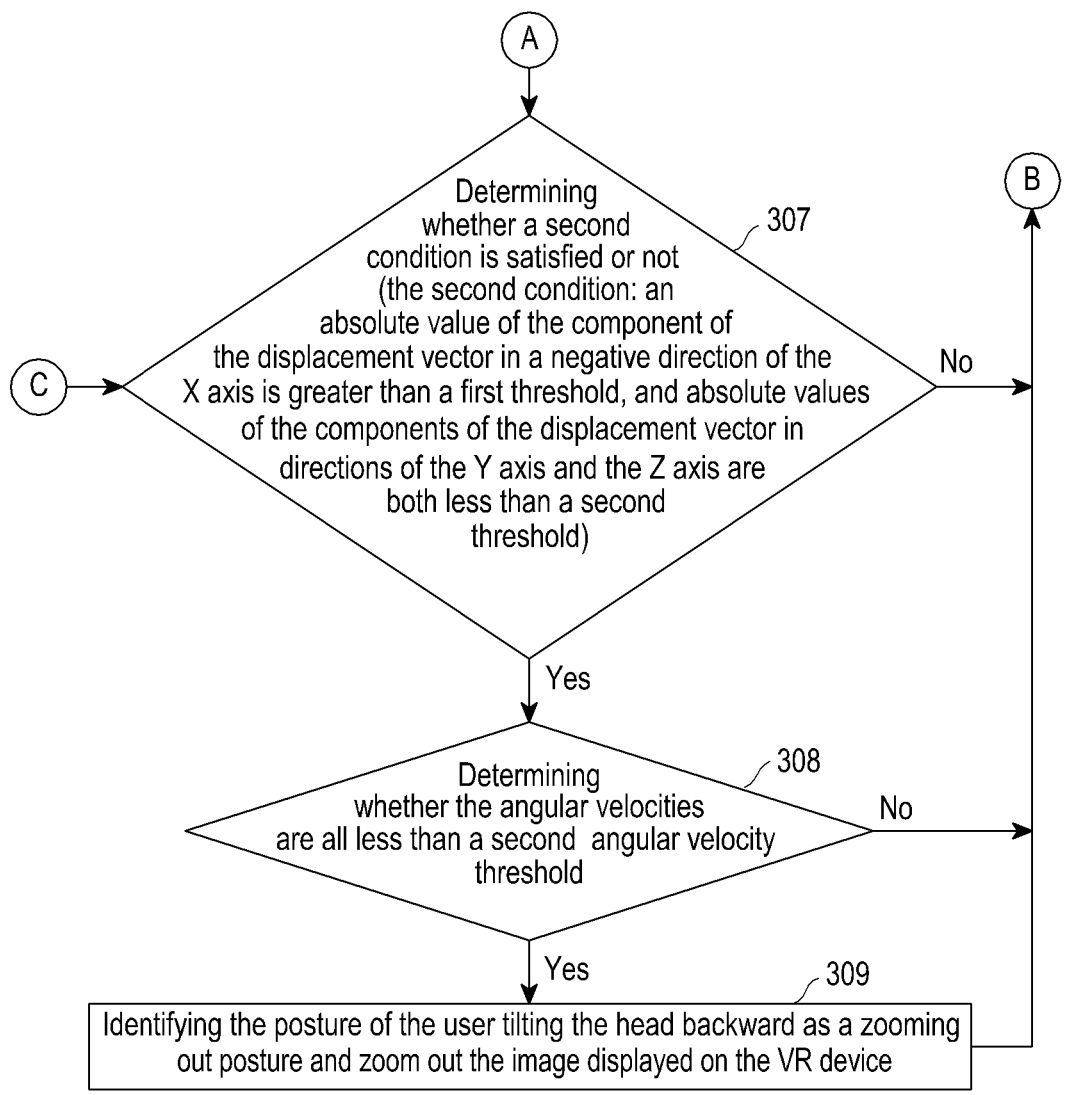

FIG. 3A and FIG. 3B are flowcharts of a method of operating a virtual reality device according to an example embodiment of the present disclosure. FIG. 4 is a diagram illustrating a method of determining a three-dimensional rectangular coordinate system in a virtual reality device according to an example embodiment of the present disclosure.

In one example embodiment, the posture for zooming in may be tilting the head forward, and the posture for zooming out may be tilting the head backward. The method may include the following steps.

In operation 301 in FIG. 3A, the VR device may identify the direction of the initial sight of the user of the VR device, and may determine coordinate system.

Figure 4:
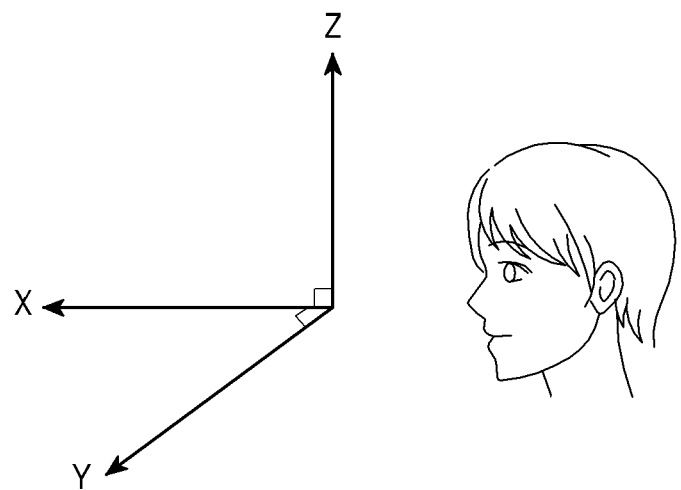
FIG. 4 is a diagram illustrating a method of determining a three-dimensional rectangular coordinate system in a virtual reality device according to an example embodiment.

With reference to FIG. 4, the VR device may define the direction of the initial sight as the positive direction of the X-axis (e.g., direction of a forward gaze). Then, the VR device may further define the direction perpendicular to the X-axis and pointing to the top of the head of the user as the positive direction of the Y-axis, and define the direction perpendicular to the X-axis and Y-axis and pointing to the left of the user's head as the positive direction of Z-axis. Thereby, a first three-dimensional rectangular coordinate system may be established.

For example, the VR device may obtain the direction of the initial sight of the user of the VR device via eye tracking technology. Specifically, the VR device may use the eye tracking technique to obtain the focus of the user's eyes on the image on the VR device, and then may determine the direction from the center of the user's eyes to the focus as the positive direction of X-axis.

In operation 302 in FIG. 3A, the VR device may estimate components of a displacement vector of the head of the user in the directions of the X-axis, the Y-axis and the Z-axis from an acceleration sensor included in the VR device.

According to one example embodiment, the virtual reality device may be a head-mounted display (HMD) that can be worn on the user's head. The head-mounted display may be in the form of a helmet, eye glasses and so on. The virtual reality apparatus may include at least one of various sensors such as an accelerometer for measuring acceleration, a gyroscope for measuring angular velocity, and a magnetometer as a geomagnetic sensor.

In operation 303, the VR device may determine whether the first condition is satisfied or not. The first condition may include that the absolute value of the component of the displacement vector of the head of the user in the positive direction of the X-axis is greater than a first threshold, and the absolute values of the components of the displacement vector of the head of the user in directions of the Y-axis and the Z-axis are both less than a second threshold. If the first condition is satisfied, operation 304 may be executed; or otherwise, operation 307 may be executed.

In operation 304, the VR device may estimate the angular velocities of the head of the user in each directions for roll, pitch, and yaw, which are rotations about the X-axis, the Y-axis, and the Z-axis, respectively, by using a sensor.

Referring to FIG. 6, the yaw may indicate a rotation angle about the Z-axis. The yaw may be defined as a counterclockwise rotation when looking the center of the coordinate axis on the Z-axis. The pitch may indicate a rotation angle about the Y-axis. The pitch may be defined as a counterclockwise rotation when looking the center of the coordinate axis on the Y-axis. The roll may indicate a rotation angle about the X-axis. The roll may be defined as a counterclockwise rotation when looking the center of the coordinate axis on the X-axis.

In step 305, the VR device may determine whether the angular velocities of the head of the user in each directions for roll, pitch, and yaw, which are rotations about the X-axis, the Y-axis, and the Z-axis, respectively, are all less than a first angular velocity threshold, if the angular velocities are all less than the first angular velocity threshold, the VR device may executes operation 306; or otherwise, may execute operation 307.

In operation 306, the VR device may identify the posture of the head of the user as tilting the head forward, and thus, the VR device may identify the posture of the head of the user as the zooming in posture. And the VR device may zoom in on the image displayed, and then may return to operation 302.

Before the VR device zooms in on the image, the VR device may further determine whether a zooming in condition is satisfied. If the zooming in condition is satisfied, the VR device may zoom in on the image; or otherwise, the VR device may return to operation 302 without zooming in on the image.

The zooming in condition may include, for example, any one or combination of the following: the zoom level (e.g., magnification power, resolution, etc.) of the image is lower than a first zoom level threshold (e.g., maximum zoom level), and the focus of the user's eyes is on the image.

In addition, before the VR device zooms in on the image, the VR device may further detect the focus of the user's eyes on the image. And the VR device may zoom in on the image by taking the focus of the user's eyes (e.g., eye gaze of the user) on the image as the center of zooming. In other words, the image may be zoomed in around the location of the user's eye gaze on the image.

In operation 306, when the VR device is zooming in on the image displayed by itself, the VR device may further detect the component of the moving speed of the head of the user in the positive direction of the X-axis of the first three-dimensional rectangular coordinate system. If the moving speed is greater than or equal to 0, the VR device may continue to zoom in on the image displayed by itself until a zooming in termination condition of the image is satisfied (for example, the zoom level of the image is greater than or equal to a maximum zoom level). And if the moving speed is less than 0, the VR device may stop zooming in on the image displayed by itself.

In operation 307 in FIG. 3B, if at least one of the angular velocities of the user's head is greater than the first angular velocity threshold, or if the first condition is not satisfied, the VR device determines whether a second condition is satisfied. The condition may include that the absolute value of the component of the displacement vector of the head of the user in the negative direction of the X-axis is greater than a first threshold, and the absolute values of the components of the displacement vector in the directions of the Y-axis and the Z-axis direction are both less than a second threshold. If the second condition is satisfied, operation 308 may be executed; or otherwise, operation 302 may be executed.

In operation 308, if the second condition is satisfied, the VR device may determine whether the angular velocities of the head of the user in each directions for roll, pitch, and yaw, which are rotations about the X-axis, the Y-axis, and the Z-axis, respectively, are less than a second angular velocity threshold. If at least one of the angular velocities is less than the second angular velocity threshold, the VR device may execute operation 309; or otherwise, the VR device may return to operation 302.

In operation 309, if the angular velocities are less than the second angular velocity threshold, then the VR device may determine the posture of the head of the user of the VR device as tilting the head backward, and thus, the VR device may determine the posture of the head of the user of the VR device as the zooming out posture. And the VR device may zoom out on the displayed image, and then may return to operation 302.

Before the VR device zooms out on the image, the VR device may further determine whether a zooming out condition is satisfied or not. If the zooming out condition is satisfied, the VR device may zoom out on the image; or otherwise, the VR device may return to operation 302 without zooming out on the image.

The zooming out condition may include, for example, any one or combination of: the zoom level of the image is higher than a second zoom level threshold (e.g., minimum zoom level), and the focus of the user's eyes is on the image.

In addition, before the VR device zooms out on the image, the VR device may further detect the focus of the user's eyes on the image. And the VR device may zoom out on the image by taking the focus of the user's eyes (e.g., eye gaze of the user) on the image as the center of zooming.

In operation 309, when the VR device is zooming out on the image displayed by itself, the VR device may further detect the component of the moving speed of the head of the user in the negative direction of the X-axis of the first three-dimensional rectangular coordinate system. If the moving speed is greater than or equal to 0, the VR device may continue to zoom out on the image displayed by itself until a zooming out termination condition of the image is satisfied (for example, the zoom level of the image is less than or equal to a minimum zoom level). And if the moving speed is less than 0, the VR device may stop zooming out on the image displayed by itself.

While various example embodiments have been described, the method of implementation is not limited thereto. For example, the order of operations shown in FIGS. 3A and 3B may be changed. For example, the order of determining steps of the first condition and the second condition may be swapped. Also, some of the operations of FIGS. 3A and 3B may be omitted or additional operations may be performed therebetween.

The thresholds of the present disclosure may be predetermined and stored in the memory unit of the virtual reality device or may be set by a user of the virtual reality device using a setup program stored in the memory unit of the virtual reality device. Further, in the present disclosure, the first threshold values and the second threshold values may be the same or different from each other.

Hereinafter, a virtual reality device according to an example embodiment of the present disclosure will be described with reference to FIG. 5.

Figure 5:
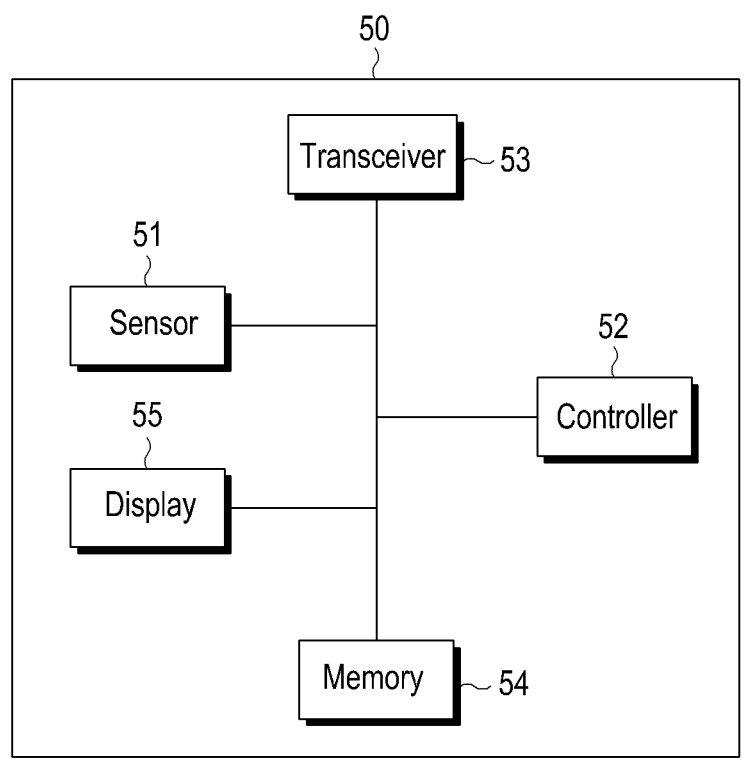
FIG. 5 is a schematic diagram illustrating the components of a VR device according to an example embodiment.

FIG. 5 is a schematic diagram illustrating the components of a VR device according to an example embodiment.

The VR device 50 may include at least one of a sensor 51, a controller 52, a transceiver 53, memory 54, and a display 55.

The sensor 51 may be configured to detect the posture of the head of the user of the VR device 50 in real time, and transmit information regarding the detected posture of the head to the controller 52.

The controller 52 may be a processor, such as a central processing unit (CPU), an application-specific integrated circuit (ASIC), a system-on-chip (SoC), etc., configured to control other components of the VR device 50 to perform the various operations of the VR device 50. The controller 52 may be configured to zoom in on the image on the VR device 50 if the posture of the head detected by the sensor 51 is a posture for zooming in; and zoom out on the image on the VR device 50 if the posture of the head detected by the sensor 51 is a posture for zooming out.

In one example embodiment, the posture for zooming in detected by the sensor 51 may be tilting the head to the left; and the posture for zooming out may be tilting the head to the right.

Or in another example embodiment, the posture for zooming in detected by the sensor 51 may be tilting the head to the right; and the posture for zooming out may be tilting the head to the left.

Or in still another example embodiment, the posture for zooming in detected by the sensor 51 may be tilting the head forward; and the posture for zooming out may be tilting the head backward.

Or in yet another example embodiment, the posture for zooming in detected by the sensor 51 may be tilting the head backward; and the posture for zooming out may be tilting the head forward.

The VR device may further include a sight detector, which is configured to detect the focus (e.g., gaze) of the user's eyes on the image in real time and transmit it to the controller 52.

In this example embodiment, when zooming in on the image, the controller 52 may zoom in on the image on the VR device by taking the focus of the user's eyes on the image detected by the sight capture module as the center of zooming.

And when zooming out on the image, the controller 52 may zoom out on the image on the VR device by taking the focus of the user's eyes on the image detected by the sight capture module as the center of zooming.

Specifically, when zooming in on the image on the VR device, the controller 52 may first detect the focus of the user's eyes on the VR image, identify a part of the image that the user is observing according to the focus of the user's eyes, and then zoom in on the part of the image that the user is observing.

When zooming out on the image on the VR device, the controller 52 may first detect the focus of the user's eyes on the VR image, identify a part of the image that the user is observing according to the focus of the eyes, and then zoom out on the part of the image that the user is observing.

Before zooming in on the image on the VR device, the controller 52 may be further configured to determine whether the zoom level of the image is lower than a first zoom level threshold (e.g., maximum zoom level), and/or, whether the focus of the user's eyes is on the image. If one or both of these conditions are met, the controller 52 may zoom in on the image; or otherwise, the controller 52 may not zoom in on the image.

Similarly, before zooming out on the image on the VR device, the controller 52 may be further configured to determine whether the zoom level of the image is higher than a second zoom level threshold (e.g., minimum zoom level), and/or, whether the focus of the user's eyes is on the image. If one of both of these conditions are met, the controller 52 may zoom out on the image; or otherwise, the controller 52 may not zoom out on the image.

In an example embodiment of the present application, when detecting the posture of the head of the user of the VR device, the sensor 51 may first define the direction indicated by the posture for zooming in as the positive direction of the X-axis, define the direction being perpendicular to the X-axis and pointing to the top of the head of the user as the positive direction of the Y-axis, and define the direction being perpendicular to the X-axis and the Y-axis as the positive direction of the Z-axis. Thus, a first coordinate system may be established.

The sensor 51 may further obtain components of a displacement vector of the head of the user in the directions of the X-axis, the Y-axis, and the Z-axis from an acceleration sensor of the VR device.

If the absolute value of the component of the displacement vector of the head of the user in the positive direction of the X-axis is greater than a first threshold, and the absolute values of the components of the displacement vector of the head of the user in the directions of the Y-axis and the Z-axis are both less than a second threshold, the sensor 51 may confirm the posture of the head of the user as the posture for zooming in.

If the absolute value of the component of the displacement vector of the head of the user in the negative direction of the X-axis is greater than the first threshold, and the absolute values of the components of the displacement vector of the head of the user in the directions of the Y-axis and the Z-axis are both less than the second threshold, the sensor 51 may confirm the posture of the head of the user as the posture for zooming out.

In another example embodiment, the sensor 51 may further obtain angular velocities of the head of the user in each directions for roll, pitch, and yaw, which are rotations about the X-axis, the Y-axis, and the Z-axis, respectively, from a gyroscope of the VR device.

In this case, the sensor 51 may determine that the posture of the head is the posture for zooming in when the component of the displacement vector of the head of the user in the positive direction of the X-axis is greater than the first threshold, the absolute values of the components of the displacement vector of the head of the user in the directions of the Y-axis and the Z-axis are both less than the second threshold, and the angular velocities of the head of the user for roll, pitch, and yaw, which are rotations about the X-axis, the Y-axis, and the Z-axis, respectively, are all smaller than an angular velocity threshold.

And if the sensor 51 may determine the posture of the head is the posture for zooming out when the component of the displacement vector of the head of the user in the negative direction of the X-axis is greater than the first threshold, the absolute values of the components of the displacement vector of the head of the user in the directions of the Y-axis and the Z-axis are both less than the second threshold, and the angular velocities of the head of the user in each directions for roll, pitch, and yaw, which are rotations about the X-axis, the Y-axis, and the Z-axis, respectively, are all smaller than an angular velocity threshold.

In still another example embodiment of the present application, when the posture for zooming in is tilting the head forward and the posture for zooming out is tilting the head backward, the sensor 51 may further implement the following functions.

The sensor 51 may obtain the direction of the initial sight of the user of the VR device from the sight detector, define the direction of the initial sight as the positive direction of the X-axis, define the direction being perpendicular to the X-axis and pointing to the top of the head of the user as the positive direction of the Y-axis, and define the direction being perpendicular to the X-axis and the Y-axis and pointing to the left of the head of the user as the positive direction of the Z-axis. Thereby, a first coordinate system may be established.

The sensor 51 may further obtain components of the displacement vector of the head of the user in the directions of the X-axis, the Y-axis, and the Z-axis from the acceleration sensor of the VR device.

If the absolute value of the component of the displacement vector of the head of the user in the positive direction of the X-axis is greater than a first threshold, and the absolute values of the components of the displacement vector of the head of the user in the directions of the Y-axis and the Z-axis are both less than a second threshold, the sensor 51 may confirm the posture of the head of the user as tilting the head forward.

And if the absolute value of the component of the displacement vector of the head of the user in the negative direction of the X-axis is greater than the first threshold, and the absolute values of the components of the displacement vector of the head of the user in the directions of the Y-axis and the Z-axis are both less than the second threshold, the sensor 51 may confirm the posture of the head of the user as tilting the head backward.

In an example embodiment of the present application, the sensor 51 may further obtain angular velocities of the head of the user in each directions for roll, pitch, and yaw, which are rotations about the X-axis, the Y-axis, and the Z-axis, respectively, from a gyroscope of the VR device.

In this case, the sensor 51 may determine that the posture of the head is tilting the head forward when the component of the displacement vector of the head of the user in the positive direction of the X-axis is greater than the first threshold, the absolute values of the components of the displacement vector of the head of the user in the directions of the Y-axis and the Z-axis are both less than the second threshold, and the angular velocities of the head of the user in each directions for roll, pitch, and yaw, which are rotations about the X-axis, the Y-axis, and the Z-axis, respectively, are all smaller than an angular velocity threshold.

An if the sensor 51 may determine that the posture of the head is tilting the head backward when the component of the displacement vector of the head of the user in the negative direction of the X-axis is greater than the first threshold, the absolute values of the components of the displacement vector of the head of the user in the directions of the Y-axis and the Z-axis are both less than the second threshold, and the angular velocities of the head of the user in each directions for roll, pitch, and yaw, which are rotations about the X-axis, the Y-axis, and the Z-axis, respectively, are all smaller than an angular velocity threshold.

In one example embodiment of the present application, when the posture for zooming in is tilting the head forward, the posture for zooming out is tilting the head backward, or when the posture for zooming in is tilting the head backward, the posture for zooming out is tilting the head forward, and when the VR device is on a vehicle, the controller 52 may implement the following functions.

When the posture for zooming in is detected, the controller 52 may calculate a difference between the component of a first acceleration vector calculated by the first acceleration sensor on the vehicle in the moving direction of the vehicle and the component of a second acceleration vector calculated by the second acceleration sensor on the VR device in the moving direction of the vehicle. And if the absolute value of the difference is greater than a predetermined value, the controller 52 may zoom in on the image on the VR device; or otherwise, the controller 52 may not zoom in on the image.

When the posture for zooming out is detected, the controller 52 may calculate a difference between the component of a first acceleration vector calculated by the first acceleration sensor on the vehicle in the moving direction of the vehicle and the component of a second acceleration vector calculated by the second acceleration sensor on the VR device in the moving direction of the vehicle. And if the absolute value of the difference is greater than a value, the controller 52 may zoom out on the image on the VR device; or otherwise, the controller 52 may not zoom out on the image.

When zooming in on the image on the VR device, the controller 52 may detect the velocity component of the head of the user in the positive direction of the X-axis. If the velocity component is greater than or equal to 0, the controller 52 may continue zooming in on the image on the VR device; or if the velocity component is less than 0, the controller 52 may stop zooming in on the image on the VR device.

When zooming out on the image on the VR device, the controller 52 may detect the velocity component of the head of the user in the negative direction of the X-axis. If the velocity component is greater than or equal to 0, the controller 52 may continue zooming out on the image on the VR device; or if the velocity component is less than 0, the controller 52 may stop zooming out on the image on the VR device.

The foregoing descriptions are merely example embodiments, which are not intended to limit the present disclosure. Any modification, equivalent replacement, or improvement made within the spirit and principle of the present disclosure shall fall within the protection scope of the present disclosure. It will be apparent that though the terms "first," "second," "third," etc. may be used herein to describe various members, components, regions, layers, and/or sections, these members, components, regions, layers, and/or sections should not be limited by these terms. These terms are only used to distinguish one member, component, region, layer, or section from another region, layer, or section. Thus, a first member, component, region, layer, or section discussed below could be termed a second member, component, region, layer, or section without departing from the teachings of the example embodiments.

The invention claimed is:

1. A method for providing an image by a virtual reality (VR) device, the method comprising:
   identifying that a posture of a user of the VR device is at least one of a zooming in posture and a zooming out posture, based on a displacement vector of a head of the user;
   determining a boundary of an object in the image based on a focus of eyes of the user on the image;
   zooming in the object in the image based on the focus of the eyes of the user on the image and the boundary of the object, in response to a zooming in condition being satisfied, wherein the zooming in condition comprises the posture of the user being the zooming in posture; and
   zooming out the object in the image based on the focus of the eyes of the user on the image and the boundary of the object, in response to a zooming out condition being satisfied, wherein the zooming out condition comprises the posture of the user being the zooming out posture,
   wherein the zooming in the image and the zooming out the image are performed by using the focus as a zoom center,
   wherein the zooming in the object comprises:
      estimating a first velocity of the head of the user in a positive direction of a first axis of a three-dimensional rectangular coordinate system;
      continuing the zooming in the object in response to the first velocity being greater than or equal to 0; and
      stopping the zooming in the object in response to the first velocity being less than 0; and
   wherein the zooming out the object comprises:
      estimating a second velocity of the head of the user in one of a negative direction of the first axis and a positive direction of a second axis of the three-dimensional rectangular coordinate system;
      continuing the zooming out the object in response to the second velocity being greater than or equal to 0; and
      stopping the zooming out the object in response to the second velocity being less than 0.

2. The method according to claim 1, wherein the identifying comprises:
   identifying that the posture of the user is the zooming in posture, in response to a first component of the displacement vector in a first positive direction of a first axis of a three-dimensional rectangular coordinate system being greater than a first threshold and a second component of the displacement vector in a second axis and a third component of the displacement vector in a third axis of the three-dimensional rectangular coordinate system being less than a second threshold; and identifying that the posture of the user is the zooming out posture, in response to at least one of:
the first component of the displacement vector in a negative direction of the first axis being greater than the first threshold and the second and third components of the displacement vector in the second axis and the third axis being less than the second threshold; and
the second component of the displacement vector in a second positive direction of the second axis being greater than the first threshold and the first and third components of the displacement vector in the first axis and the third axis being less than the second threshold.

3. The method according to claim 2, further comprising determining whether angular velocities of the head of the user in each rotation directions for roll, pitch, and yaw are less than an angular velocity threshold,
wherein at least one of the zooming in the image and the zooming out the image is performed in response to the angular velocities being less than the angular velocity threshold.

4. The method according to claim 1, further comprising:
identifying a focus of eyes of the user on the image; and
identifying a part of the image, the part being observed by the user according to the focus,
wherein the zooming in the image comprises zooming in the part of the image, and
wherein the zooming out the image comprises zooming out the part of the image.

5. The method according to claim 1, wherein the zooming in condition further comprises at least one of:
a zoom level of the image being lower than a first zoom level threshold, and
the focus of the eyes of the user being located on the image, and
wherein the zooming out condition further comprises at least one of:
the zoom level of the image being higher than a second zoom level threshold, and
the focus of the eyes of the user being located on the image.

6. The method according to claim 1, wherein each of the zooming in condition and the zooming out condition further comprises:
an absolute value of a difference between a first acceleration vector in a moving direction of a vehicle estimated by the vehicle on which the user is boarding and a second acceleration vector in the moving direction of the vehicle estimated by the VR device is greater than a threshold.

7. The method according to claim 1, wherein at least one of:
the zooming in posture is tilting the head to left of the user, and the zooming out posture is tilting the head to right of the user;
the zooming in posture is tilting the head to the right of the user, and the zooming out posture is tilting the head to the left of the user;
the zooming in posture is tilting the head forward of the user, and the zooming out posture is tilting the head backward of the user; and
the zooming in posture is tilting the head backward of the user, and the zooming out posture is tilting the head forward of the user.

8. A virtual reality (VR) device for providing an image, the VR device comprising:
a sensor configured to estimate a movement of a head of a user of the VR device; and
a controller configured to:
identify that a posture of the user is at least one of a zooming in posture and a zooming out posture, based on a displacement vector of the movement,
determine a boundary of an object in the image based on a focus of eyes of the user on the image;
zoom in the object in the image based on the focus of the eyes of the user on the image and the boundary of the object, in response to a zooming in condition being satisfied, wherein the zooming in condition comprises the posture of the user being zooming in posture, and
zoom out the object in the image based on the focus of the eyes of the user on the image and the boundary of the object, in response to a zooming out condition being satisfied,
wherein the zooming out condition comprises the posture of the user being the zooming out posture,
wherein the zooming in the image and the zooming out the image are performed by using the focus as a zoom center,
wherein the zooming in the object comprises:
estimating a first velocity of the head of the user in a positive direction of a first axis of a three-dimensional rectangular coordinate system;
continuing the zooming in the object in response to the first velocity being greater than or equal to 0; and
stopping the zooming in the object in response to the first velocity being less than 0; and
wherein the zooming out the object comprises:
estimating a second velocity of the head of the user in one of a negative direction of the first axis and a positive direction of a second axis of the three-dimensional rectangular coordinate system;
continuing the zooming out the object in response to the second velocity being greater than or equal to 0; and
stopping the zooming out the object in response to the second velocity being less than 0.

9. The VR device according to claim 8, wherein the controller is further configured to:
identify that the posture of the user is the zooming in posture, in response to a first component of the displacement vector in a first positive direction of a first axis of a three-dimensional rectangular coordinate system being greater than a first threshold and a second component of the displacement vector in a second axis and a third component of the displacement vector in a third axis of the three-dimensional rectangular coordinate system being less than a second threshold; and
identify that the posture of the user is the zooming out posture, in response to at least one of:
the first component of the displacement vector in a negative direction of the first axis being greater than the first threshold and the second and third components of the displacement vector in the second axis and the third axis being less than the second threshold; and
the second component of the displacement vector in a second positive direction of the second axis being greater than the first threshold and the first and third components of the displacement vector in the first axis and the third axis being less than the second threshold.

10. The VR device according to claim 9, wherein the controller is further configured to:
determine whether angular velocities of the head of the user in each rotation directions for roll, pitch, and yaw are less than an angular velocity threshold;
zoom in the image in response to the angular velocities being less than the angular velocity threshold; and
zoom out the image in response to the angular velocities being less than the angular velocity threshold.

11. The VR device according to claim 8, wherein the controller is further configured to:
identify a focus of eyes of the user on the image.

12. The VR device according to claim 8, wherein the controller is further configured to:
identify the focus of the eyes of the user on the image;
identify a part of the image, the part being observed by the user according to the focus;
zoom in the part of the image, in response to the zooming in condition being satisfied; and
zoom out the part of the image, in response to the zooming out condition being satisfied.

13. The VR device according to claim 8, wherein the zooming in condition further comprises:
a zoom level of the image being lower than a first zoom level threshold, and
a focus of eyes of the user being located on the image, and,
wherein the zooming out condition further comprises at least one of:
the zoom level of the image being higher than a second zoom level threshold, and
the focus of the eyes of the user being located on the image.

14. The VR device according to claim 8, wherein each of the zooming in condition and the zooming out condition further comprises:
an absolute value of a difference between a first acceleration vector in a moving direction of a vehicle estimated by the vehicle on which the user is boarding and a second acceleration vector in the moving direction of the vehicle estimated by the VR device is greater than a threshold.

15. The VR device according to claim 8, wherein at least one of:
the zooming in posture is tilting the head to left of the user, and the zooming out posture is tilting the head to right of the user;
the zooming in posture is tilting the head to right of the user, and the zooming out posture is tilting the head to left of the user;
the zooming in posture is tilting the head forward of the user, and the zooming out posture is tilting the head backward of the user; and
the zooming in posture is tilting the head backward of the user, and the zooming out posture is tilting the head forward of the user.

16. A non-transitory computer-readable storage medium storing instructions which, when executed by a processor, cause the processor to perform operations comprising:
detecting a displacement vector of a movement of a head of a user of a virtual reality (VR) device that displays an image;
identifying a posture of the user based on the displacement vector;
determining a boundary of an object in the image based on a focus of eyes of the user on the image;
in response to the posture of the user corresponding to a zoom-in command, zooming in the object in the image based on the focus of the eyes of the user on the image and the boundary of the object; and
in response to the posture of the user corresponding to a zoom-out command, zooming out the object in the image based on the focus of the eyes of the user on the image and the boundary of the object,
wherein the zooming in the image and the zooming out the image are performed by using the focus as a zoom center,
wherein the zooming in the object comprises:
estimating a first velocity of the head of the user in a positive direction of a first axis of a three-dimensional rectangular coordinate system;
continuing the zooming in the object in response to the first velocity being greater than or equal to 0; and
stopping the zooming in the object in response to the first velocity being less than 0; and
wherein the zooming out the object comprises:
estimating a second velocity of the head of the user in one of a negative direction of the first axis and a positive direction of a second axis of the three-dimensional rectangular coordinate system;
continuing the zooming out the object in response to the second velocity being greater than or equal to 0; and
stopping the zooming out the object in response to the second velocity being less than 0.

17. The non-transitory computer-readable storage medium according to claim 16, wherein the posture corresponds to the zoom-in command when the displacement vector indicates a forward movement of the head of the user, and
wherein the posture corresponds to the zoom-out command when the displacement vector indicates a backward movement of the head of the user.

* * * * *